Feb. 20, 1968   A. L. FREEDLANDER ETAL   3,369,354
LAWN MOWER BLADE
Filed March 24, 1967   3 Sheets-Sheet 1
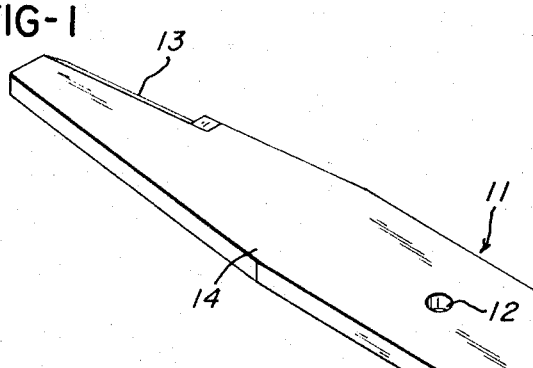
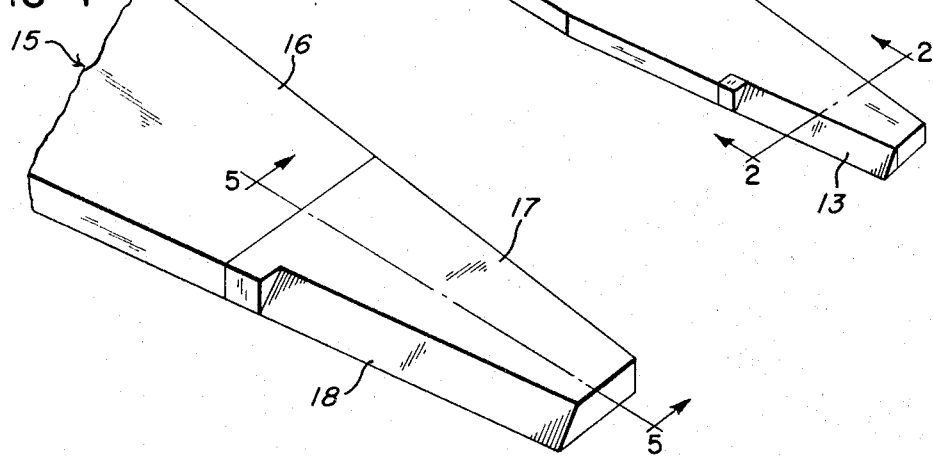
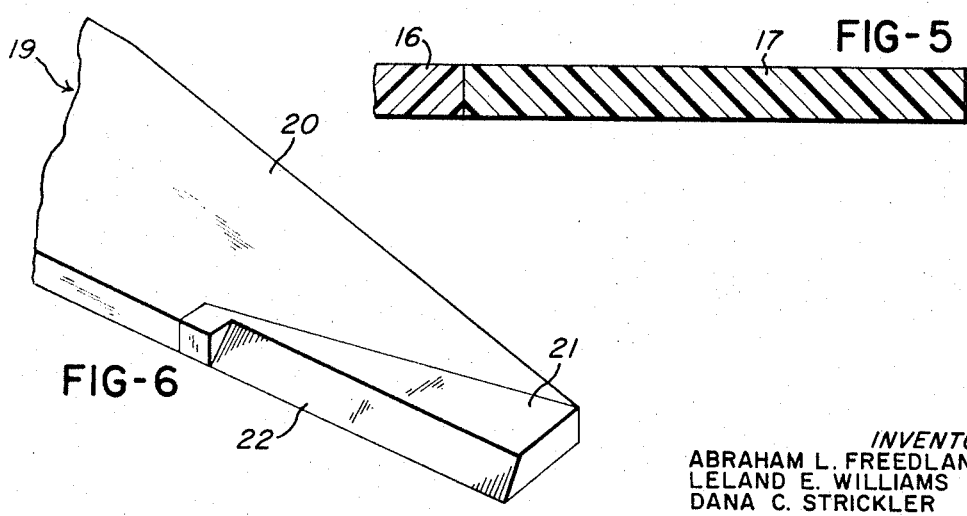
INVENTORS
ABRAHAM L. FREEDLANDER
LELAND E. WILLIAMS
DANA C. STRICKLER
BY
Reuben Wolf
ATTORNEY

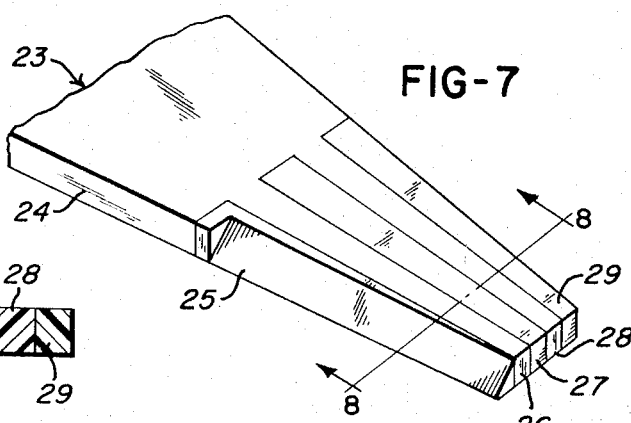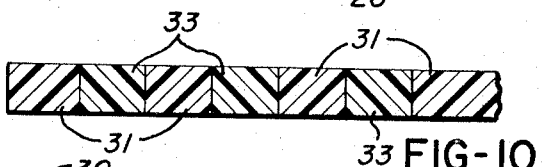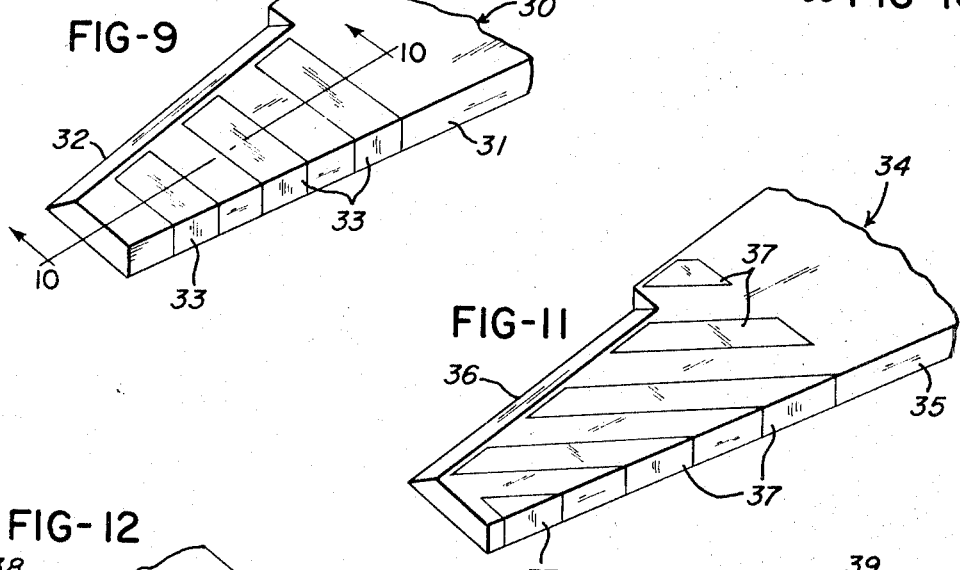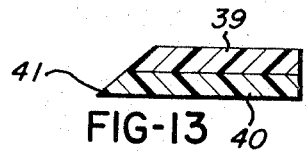

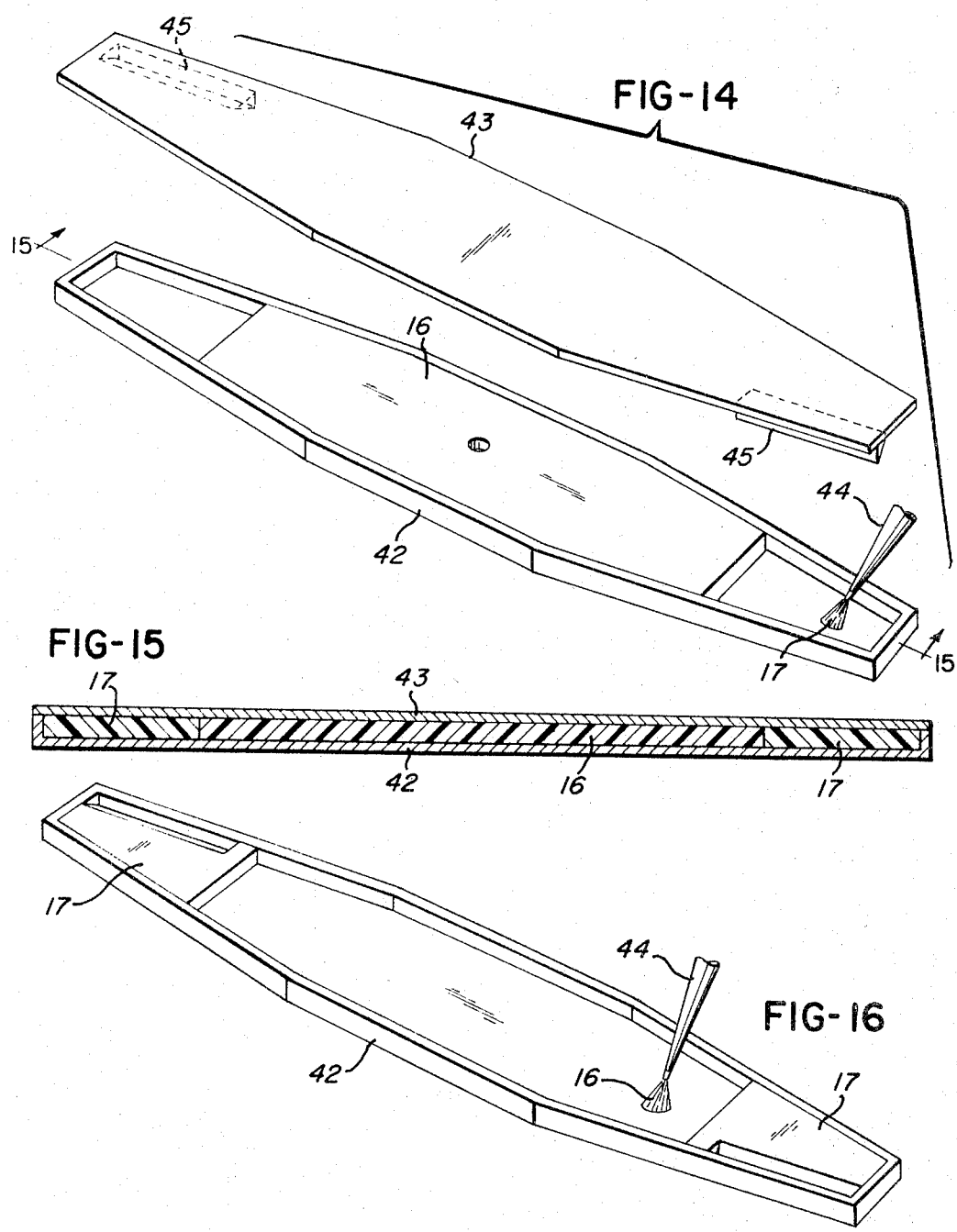

3,369,354
LAWN MOWER BLADE
Abraham L. Freedlander, Dayton, Ohio, and Leland E. Williams and Dana C. Strickler, Waynesville, N.C., assignors to Dayco Corporation, Dayton, Ohio, a corporation of Delaware
Filed Mar. 24, 1967, Ser. No. 625,657
14 Claims. (Cl. 56—295)

ABSTRACT OF THE DISCLOSURE

A flexible lawn mower blade for mounting on a power driven rotary lawn mower. The blade is designed for safety as the material permits it to flex when striking an object to avoid serious damage to the object or the blade. The blade is partially composed of a flexible elastomeric material such as a urethane elastomer and a dissimilar material which may be a different type of urethane elastomer or may be a plastic material.

---

Conventional lawn mowers used by the average homeowner are usually rotary and are gasoline or electric motor operated. This type of mower is also popular for industrial mowing operations. The term "rotary" refers to a mower in which the shaft extends vertically downward from the housing and upon which the blade is mounted so that it rotates in a plane parallel to the ground. This type of mower is popular because it is simple to operate, inexpensive to build, and performs a highly satisfactory job of cutting grass and weeds. Unfortunately, however, the extremely high speeds at which some mowers operate, up to 3600 r.p.m., cause the blades to create extremely high hazards. For example, there have been many cases known where the operator's foot has accidentally slipped under the housing and has been struck by the rotating blade, causing serious injury to, and even amputation of, the foot. In addition, the conventional metal cutting blade may strike large rocks, posts, or other objects in the lawn, and the sudden shock may cause the blade to break, hurling pieces of metal at tremendous speeds to cause injury to the operator or to the persons close by. In the case of loose stones and other obstructions, these objects are also often struck by a rigid metal blade and caused to be thrown great distances to create damage to persons or property. A further disadvantage of the conventional metal blade used in the rotary mower is that it becomes dull very quickly and must be resharpened for proper efficiency.

The present invention is designed to overcome the many disadvantages recited above, while at the same time retaining the advantages of the rotary type blade. The invention utilizes a blade having arms somewhat similar to those of a metal blade, but made of an elastomeric material that is sufficiently rigid to cut grass as efficiently as a metal blade, and yet sufficiently flexible to permit the blade to flex when striking an object such as a shoe. This flexing action permits the blade to ride over the object and thus avoid serious damage to the foot. This flexing is also useful in an immovable object, such as a large rock or post, is encountered, since the blade is still permitted to flex and ride over this object; at the same time, the blade has a certain amount of inherent elasticity that tends to cushion the initial shock and prevent the blade from breaking. In the case of small rocks, etc. the flexing action will somewhat cushion the initial impact and reduce the amount of speed at which these small objects are hurled. The novel blade also has the property of being able to flex repeatedly without destroying any of its properties, and also retains a cutting edge a remarkably long time. The material utilized also has the properties of elongating only a very small amount during operation and yet has sufficient elastic memory to return to its original size despite many hours of use. Despite the fact that it is elastomeric, the blade itself does not get softer during operation, but retains its initial properties that provide an excellent compromise between sufficient rigidity for cutting and sufficient flexibility for safety. The blade is also extremely simple to manufacture and very low in cost.

In the prior art certain elastomeric or plastic materials have been illustrated, as in the patents issued to Tatum No. 3,133,398, Voigt No. 3,104,510 and Ely No. 3,302,377, all of whom contemplate the use of rubber materials with additional stiffening materials such as solid particles, screens, or fabric. United States Patent No. 3,156,082 to Joyner suggests the use of a polyethylene material. Blades made solely of these materials have been tried by applicants and have been found wanting, primarily since rubber and polyethylene do not provide a satisfactory cutting edge. In addition, the rubber material cannot be used without the reinforcements mentioned, and the type of polyethylene material which is soft and flexible enough to avoid injury also requires a reinforcement. However, there are certain properties of these materials which applicants have found to be useful in combination with other materials that do have improved abrasion and elongation resistance, and it is contemplated that these materials be used in such combinations.

Of common assignment is United States patent application Ser. No. 579,304 relating to the use of a urethane elastomer for a lawn mower blade because of the superior abrasion resistance, tear resistance and low elongation, combined with the necessary flexibility to eliminate injuries. The present invention contemplates the use of this material for that portion of the blade which does the actual cutting in order to take advantage of its desirable properties. By using this material in the cutting edge or the tip, and combining it with certain other materials that are cheaper and have a low elongation, it is possible for the first time to tailor-make a lawn mower blade in order to meet the various conditions of mowing which exist. For example, certain types of grass and certain moisture conditions may require blades that are more or less flexible, depending on whether a problem of digging into the turf exists. In addition, while it is difficult to answer the question "how safe is safe?" it is possible to have a flexible blade having a high degree of safety when certain combinations of materials are used; and a stiffer blade with reduced degree of safety when other combinations are used. Between the opposite poles of rigidity and flexibility are these various degrees which can be achieved for the first time by means of this invention, as will be described in the following specification. The basic principle to be followed is to make the cutting edge of the blade abrasion and tear resistant while making principal body of the blade resistant to elongation, cheaper, and with various degrees of rigidity as the situation requires.

The specific cutting material which has been found most acceptable is a urethane elastomer, and more particularly, but without limitation, an elastomer of the type which may be cast or molded and formulated from a polyester or polyether based isocyanate terminated prepolymer. The remaining material may be either an elastomer such as a different urethane, or rubber; or rigid or flexible plastic materials of either the thermoplastic or thermosetting groups.

The novel principles embodied herein are more fully brought out in the following specification and claims and in the drawings, in which:

FIGURE 1 is a perspective view of one form of the novel blade.

FIGURE 2 is a cross-sectional view taken along line 2—2 of FIGURE 1.

FIGURE 3 is a view similar to FIGURE 2 illustrating a modified cross section.

FIGURE 4 is a perspective view illustrating a broken portion of another form of the novel blade.

FIGURE 5 is a cross-sectional view taken along line 5—5 of FIGURE 4.

FIGURE 6 is a perspective view illustrating a broken portion of still another form of the invention.

FIGURE 7 is a perspective view illustrating a portion of another form of the novel blade.

FIGURE 8 is a cross-sectional view taken along line 8—8 of FIGURE 7.

FIGURE 9 is a perspective view illustrating another form of the novel blade.

FIGURE 10 is a cross-sectional view taken along line 10—10 of FIGURE 9.

FIGURES 11 and 12 are perspective views of other forms of the invention.

FIGURE 13 is a cross-sectional view taken along line 13—13 of FIGURE 12.

FIGURE 14 is a perspective view illustrating a method of forming the novel blade.

FIGURE 15 is a cross-sectional view illustrating a further step in the formation of the blade and taken along line 15—15 of FIGURE 14.

FIGURE 16 is a view similar to FIGURE 14, illustrating a modified method of manufacture.

Referring now to the drawings, FIGURE 1 illustrates a novel lawn mower blade having the general configuration of the blade described in the earlier application Ser. No. 579,304, of common assignment. This blade, designated by reference numeral 11, is approximately rectangular in shape but is beveled at its outer tips. In the center of the blade is a mounting hole 12, and at the extremities of the tips are cutting edges 13. In this form of the invention the main body portion 14 is formed of one of the materials, while the cutting edges 13 are formed of a different material. As described above, the general principle which is embodied in this invention is to utilize two different materials extending throughout the thickness of the blade, the cutting edges 13 composed of a material which is a flexible elastomer such as urethane which is highly abrasion resistant, has superior cut and tear resistance, and is sufficiently flexible so that when it strikes a human limb or shoe it will tend to glide over this member rather than cutting it as would happen with a steel cutting edge. The material will also tend to glide over large rocks or other immovable objects rather than causing them to shatter into a number of pieces, the edge having sufficient cushioning effect to prevent this occurrence. A preferred type of material is a urethane elastomer which may be cast or molded and is formulated from a polyester or polyether based isocyanate terminated prepolymer, formed through a chain extension with selected polyols or other polyfunctional active hydrogen materials. This material is further described in the above-referenced patent application. The body 14 may be made of a material which is a different type of elastomer such as a different urethane elastomer, or even synthetic or natural rubber. Basically, the body of the blade is made of cheaper material and may be somewhat stiffer or more rigid than the cutting edge and will have considerably less elongation. One type of urethane elastomer that is useful for this purpose is a polyether based material that is an adduct of propylene oxide cross-linked with a diisocyanate. The body may also be made, if preferred, of a flexible or rigid plastic. It may be a thermoplastic, such as polyethylene (either high, medium or low molecular weight), polyvinyl chloride, polypropylene, nylon, ABS, polycarbonate, polyimide, polystyrene, polyphenylene oxide, acetal, or other materials of this type. It may be a thermosetting plastic such as an epoxy, phenol formaldehyde or melamine. The materials may range from those that are completely rigid to highly flexible, depending on the end use for which the specific blade is to be put. Whichever combination of materials is used, however, it is desirable that the cutting edge have greater abrasion and tear resistance than the body material, while the body has lower elongation and greater stiffness.

The cutting edge 13 may be joined to the body along a junction line that is at right angles to the upper and lower surfaces as shown in FIGURE 2, or may be joined along a junction line which is at angles to the upper and lower surfaces as shown in FIGURE 3.

FIGURE 4 illustrates a further form of the invention in which the blade 15 is formed of a body portion 16 and a separate tip 17 having a cutting edge 18. In this case the entire tip 17 is formed of the same material as the cutting edge 13 of the FIGURE 1 embodiment. This form of the blade particularly lends itself to a flexible tip and a comparatively rigid body portion, since the necessary flexibility for gliding over objects is present in the entire tip.

FIGURE 6 illustrates another form of the invention in which the blade 19 has a body portion 20 and a tip section 21 with a cutting edge 22. In this case, the tip section 21 does not form the entire outer tip as in FIGURE 4, but a triangular-shaped piece which is joined to the body portion 20.

The embodiments illustrated in FIGURES 1–6 are only some of the many methods by which a cutting edge may be provided of separate material from the body, and it is contemplated that many other shapes and arrangements may also be utilized in the practice of the invention.

FIGURES 7 and 8 illustrate another form of the blade 23 which includes a body portion 24 that is made of the same material as the body material 14 described above. In this form of the invention, however, the cutting edge 25, as well as additional longitudinally extending strips 27 and 29, is made of a different material, such as the same material described in connection with the cutting edge 13. These strips are alternately inserted in the tip area so that the sections 26 and 28 that are a portion of the body 24 act as separators. It is also understood that strips 27 and 29 may be of a third material or even a third and fourth material when compared with the cutting edge 25 and the body 24.

FIGURES 9 and 10 illustrate a variant of the FIGURES 7 and 8 modification, in which the blade 30 consists of the body portion 31 and the cutting edge 32. This blade also utilizes a series of strips 33 which extend transversely of the tip up to the cutting edge. In this case the body portion and the cutting edge may all be made of the same material, but the strips 33 have been inserted to provide additional strength or to affect the flexibility of the blade.

FIGURE 11 illustrates another blade 34 having a body portion 35 and a cutting edge 36 in which a number of strips 37 are inserted at an angle to the longitudinal axis of the blade. Just as in the FIGURES 9 and 10 embodiment, strips 37 may be made of one or more materials which are different from the material used in the body of the blade.

FIGURE 12 illustrates still another blade 38 which is composed of two dissimilar layers of material so that the upper and lower halves of the blade are made of dissimilar materials. The entire blade may be composed of these materials, or alternatively only the tip portion might be formed of these dissimilar materials with the main portion of the blade being only a single material. As illustrated in FIGURES 12 and 13, the upper portion 39 is made of one material, whereas the lower portion 40 is made of another, the tip being designated by reference numeral 41. In this form of the blade the lower portion 40 would be made of a material having superior cutting qualities like the segment 13 of FIGURE 1, whereas the upper portion 39 would be made of the body material similar to the material 14 of FIGURE 1. The actual cutting is accomplished by the lowermost sharpened portion of the cutting edge, and therefore this will bear the brunt of the cutting while the remainder of the material provides the other functions which have been discussed above.

All of the modifications of the invention illustrated in FIGURES 7-13 are indicative of some of the ways in which the physical properties of the blade may be controlled. By combining materials of various stiffness, density, elongation, abrasion resistance, tear resistance, etc., is is possible for the first time to "tailor-make" a lawn mower blade so that you can achieve a blade providing various degrees of safety. Research has shown that maximum possible safety may be achieved with a greater flexibility, but the rigidity and attendant elongation may be sacrificed. By this invention, various materials can be combined to provide a blade with slightly reduced safety factor, but improvement of other factors. By combining the various strips or layers of material, the tip of the blade may be made more or less flexible, increases or decreases the amount of digging into the ground which occurs when the blade is rotated, and renders the blade subject to more or less elongation. The specific arrangement of these materials will affect the cushioning effect taking place within the tip of the blade.

FIGURES 14 and 15 illustrate a preferred method of manufacturing any of the blades which have been discussed above. It should be understood that any of the configurations shown may be made by the following method, but for purposes of illustration the blade 15 of FIGURE 4 will be used. To manfacture the blade a mold 42 is utilized in conjunction with a mold cover 43. The body portion 16 is prefabricated in the exact shape illustrated and laid within the mold 42 as shown. As indicated above, the body portion may be a plastic, or an elastomer such as rubber or urethane. The tips 17 are to be formed of a urethane elastomer with superior abrasion resistance and cutting properties; the castable material is simply poured in liquid form from a delivery tube 44 into the ends of the mold until it fills the remaining portions of the mold that form the tips 17. The mold cover 43 may be placed on the completed assembly and cured under pressure at about 240° F. The segments 45 of the cover will form the cutting edges. The liquid elastomeric material 17 will bond itself very close to the mating surfaces of the preformed body portion 16 and form an integral and permanent structure. In order to improve the bond, it is also possible to treat the mating edges of the body portion, such as by etching the material by treating with sodium hydroxide or other caustic material.

FIGURE 16 illustrates a modification of the above-described process in which substantially the same steps are followed, except that in this case the tips 17 may be preformed and placed in the mold 42, while the body portion 16 is poured into the mold in liquid form. The curing then takes place as before.

It is also possible to "open" cast the blade under certain conditions, in which case the cover 43 may be eliminated. It should also be kept in mind that the blades may be cast or molded without the beveled cutting edges such as 18, in which case they may be machined at a later time.

Further modifications in structure which are not illustrated are contemplated herein. For example, the blade need not be limited to two arms, but may have three, four or more arms. Additional modifications within the scope of the invention are also contemplated.

We claim:
1. In a lawn mower having a rotatable shaft and a cutting blade mounted thereon, said blade having a body portion and an integral cutting portion composed of a flexible elastomer dissimilar from said body portion, both of said portions being coextensive throughout the thickness of the blade.
2. The blade of claim 1 in which said elastomer is urethane.
3. The blade of claim 1 in which the body portion is a plastic material.
4. The blade of claim 1 in which said elastomer is urethane and the body portion is a plastic material.
5. The blade of claim 4 in which said plastic material is selected from the group comprising polyethylene, polypropylene, nylon, acetal, polyvinyl chloride, ABS, polystyrene, polycarbonate, polyimide, polyphenylene oxide, and blends thereof.
6. The blade of claim 1 having a plurality of strips composed of one of said materials and the principal body portion composed of the other material.
7. The blade of claim 6 in which said strips extend longitudinally of said blade.
8. The blade of claim 6 in which said strips extend transversely of said blade.
9. The blade of claim 6 in which said strips extend at an angle to the longitudinal axis of said blade.
10. The blade of claim 1 in which said portions are composed of at least two different flexible elastomers.
11. The blade of claim 10 in which said cutting portion is composed of a urethane elastomer.
12. The blade of claim 10 in which said materials are urethane elastomers.
13. In a lawn mower having a rotatable shaft and a cutting blade mounted thereon, said blade having at least two separate horizontal layers of dissimilar materials, one of said materials being a flexible elastomer and the other of said materials being a plastic.
14. The blade of claim 13 in which said blade has a central portion and a cutting portion, said separate layers extending only into said cutting portion.

References Cited
UNITED STATES PATENTS 3,104,510  9/1963  Voigt _____ 56—295

ANTONIO F. GUIDA, *Primary Examiner.*

ABRAHAM G. STONE, *Examiner.*